United States Patent [19]

Fabre

[11] 4,287,219

[45] Sep. 1, 1981

[54] FIBROUS EDIBLE PROTEINS HAVING FAT PARTICLES HOMOGENEOUSLY DISPERSED THERETHROUGH

[75] Inventor: Albert Fabre, Venissieux, France

[73] Assignee: Rhone-Poulenc Industries, Paris, France

[21] Appl. No.: 123,917

[22] Filed: Feb. 22, 1980

Related U.S. Application Data

[63] Continuation-in-part of Ser. No. 876,053, Feb. 8, 1978, abandoned.

[30] Foreign Application Priority Data

Feb. 10, 1977 [FR] France ................................ 77 04307

[51] Int. Cl.³ .......................................... A23J 3/00
[52] U.S. Cl. ..................................... 426/276; 426/574; 426/601; 426/656; 426/657; 426/516; 426/802
[58] Field of Search ............... 426/104, 276, 516, 574, 426/601, 656, 657, 802, 573

[56] References Cited

U.S. PATENT DOCUMENTS

| | | | |
|---|---|---|---|
| 2,730,447 | 1/1956 | Boyer | 426/656 X |
| 2,785,069 | 3/1957 | Dudman | 426/802 X |
| 3,623,885 | 11/1971 | Hamdy | 426/656 X |
| 3,843,803 | 10/1974 | Yano et al. | 426/276 X |
| 3,919,435 | 11/1975 | Feldbrugge et al. | 426/574 |
| 4,031,267 | 6/1977 | Berry et al. | 426/802 X |
| 4,125,634 | 11/1978 | Plaskett | 426/276 X |

*Primary Examiner*—Robert A. Yoncoskie
*Attorney, Agent, or Firm*—Burns, Doane, Swecker & Mathis

[57] ABSTRACT

Filamentary edible proteins having fat globules uniformly dispersed therethrough are shaped, e.g., by wet spinning, from homogeneous protein/fat formulations, the diameters of the fat globules being from 1 to 60 microns and the fat having a degree of saponification of no greater than 5%. Such fibrous proteins are, for example, attractive meat substitutes.

23 Claims, 4 Drawing Figures

FIBROUS EDIBLE PROTEINS HAVING FAT PARTICLES HOMOGENEOUSLY DISPERSED THERETHROUGH

CROSS-REFERENCE TO RELATED APPLICATION

This is a continuation-in-part of Ser. No. 876,053, filed Feb. 8, 1978, now abandoned.

BACKGROUND OF THE INVENTION

1. Field of the Invention

The present invention relates to novel, fibrous or filamentary edible proteins having certain fat particles homogeneously incorporated therein and uniformly distributed therethrough, and, more especially, relates to such fibrous food substitutes, optionally containing yet other food additives, to the method for spinning such edible proteins, and to certain apparatus for carrying out such method.

2. Description of the Prior Art

Considerable work has been done in the field of texturing various vegetable or animal proteins, in order to give them the appropriate texture, flavor and appearance which enable their use as foodstuffs for both man and animal. Extrusion and spinning are the most commonly used methods for converting crude proteins into more refined products which can be used, e.g., as meat substitutes.

By "spinning" as used herein, same is to be understood as meaning a process for the shaping of filamentary material by extrusion of a solution, a dispersion or a gel through a plate provided with orifices of small diameter, designated a spinneret or die, having a suitable shape and suitable dimensions. Threads, filaments and fibers (hereinafter simply "fibers", where practicable; usually a filament is one of continuous length, whereas a fiber is cut into shorter lengths) will denote the products obtained according to the spinning process, and a tow or bundle will denote the combination of the said filaments. Spinning offers the advantage of reproducing the fibrous nature of meats and makes it possible to obtain products which are varied in their appearance and their nutritive value. However, spinning requires the use of purified proteins such as the isolates which are powders typically comprising more than 90% of proteins. In fact, products having less than 70% of proteins cannot be directly spun.

In order to be spun, the proteins must be first converted into a protein gel; in the present text, a dispersion of protein isolates in a suitable dispersion medium, such as an alkaline solution, will be called a protein gel or a colloidal dispersion, it being possible for the said dispersion to go as far as forming a colloidal solution, depending on the type of proteins dispersed and the dispersing agent employed. The dispersion of protein isolates in a suitable dispersion medium, such as an alkaline solution, to form a protein gel or protein dispersion is well-known. See, for example, Boyer U.S. Pat. Nos. 2,730,447 and 2,682,466.

In order to produce products which simulate meat as closely as possible (meat being a term which, within the scope of the invention, encompasses both the flesh of mammals and that of birds, fish, crustaceans and other animals which man consumes in his diet), it is essential to reproduce the fibrous texture of the natural meat, to impart a good flavor to the protein fibers by adding various additives and adjuvants, and, especially, to introduce a certain amount of well-distributed fat-containing material into the said fibers.

Various methods of adding fat-containing material have been proposed to this art. For example, a process is known (compare French Pat. No. 1,048,464 and Boyer U.S. Pat. No. 2,682,466) which consists in dipping the previously coagulated protein filaments in a bath of fat. An outer coating is thus obtained on the fibers. It has been shown that this fat-containing material is not distributed inside the fibers by this process, but remains on the outside (as a sheath), giving rise to a certain heterogeneity. Furthermore, it is not possible to predetermine the amount of fat-contanng material which will be introduced, or to retain it during a subsequent processing of the fibers, such as, for example, cooking.

It too has been recommended to introduce the fat-containing material directly into the protein gel and to spin the mixture (compare Boyer U.S. Pat. No. 2,730,447). However, the homogeneity of said mixture, whether acceptable or poor, depends on the physical state of the fat-containing material. On the other hand, the prolonged contact of the fat-containing material with alkaline agents inherent in the Boyer discontinuous process effects partial saponification of the fat, altering the taste and leading to poorer digestibility of the resultant product. In addition, as the mixture of protein gel and fat-containing material is prepared in advance, and the spinning operation requires a certain period of time, the quality of the fibers thus obtained is neither constant nor is it reproducible. Also, it is to be noted that Boyer U.S. Pat. No. 2,730,447 teaches heating of the protein gel (a dispersion of protein with sodium and water) to about 160° F. (70° C.), followed by thorough mixing of a modifying agent such as cod liver oil, salad oil, hydrogenated animal or vegetable oil and subsequent spinning of the mixture in an acid coagulating both. Thus, the Boyer process suffers from the additional significant disadvantage of protein degradation which is caused by the combination of heat and alkaline conditions used therein. In fact, it is now known and recognized as a significant problem in the art that the heating of a protein even to around 60° C. in the presence of an alkaline agent causes protein degradation. Thus, modifications in the composition of the amino acids in the protein take place, notably the disappearance of certain nutritionally valuable amino acids such as cystine, cysteine and others, and the appearance of unnatural, possible toxic amino acid derivatives such as lysinoalanine. See, for example, Cheftel et al, "Technologie et Valeur Nutritionnelle de Protéines", *Revue française des corps gras,* 23° année, No. 1, January 1976, pp. 7-9; Rham et al, *Cereal Chem.* 54(2), pp. 238≧245; and P. Besançon, "Incidences des Traitements Technologiques sur la Valeur Nutritionnelle des Proteins D'Oleagineaux", Proceedings of the 13th World Congress, International Society for Fat Research, Aug. 30–Sept. 4, 1979, Symposium 9, pp. 49–51. For example, Rham et al report that in the case of alkaline treatment of a dispersion of soybean protein at 65° C. and pH 12.5 for 1.5 minutes, the disappearance of 40% of the cystine and cystine amino acids is noted.

In view of the foregoing, the present applicant proposed to prepare the protein gel in the cold state, i.e. at a temperature between about 2° and 25° C., so as not to degrade the protein. However, when it was attempted to introduce the fat-containing material into the cold protein gel by the method of Boyer U.S. Pat. No. 2,730,447, two difficulties were encountered: the dispersion of the fat-containing material in the gel was poor; and spinning was difficult because of clogging of the spinneret, thus making continuous operation impossible. These problems are evident from the description of an attempt to incorporate fat-containing material in a protein gel by utilizing the Boyer process at a low temperature which is entitled "COMPARATIVE EXAMPLE" and is set forth hereinafter.

Therefore, in view of the above there exists a great need in the art for fibrous, edible proteins retaining the nutritional values of the proteins from which they are prepared and containing fine, homogeneously dispersed particles of fat-containing material uniformly distributed therein, the said fat-containing material being unmodified before its incorporation and being retained during the subsequent processing and during the various uses to which said proteins are put, including human consumption.

SUMMARY OF THE INVENTION

It has now surprisingly been found that those disadvantages characterizing the state of the art can be obviated by spinning a novel edible protein comprising a filamentary proteinaceous matrix and a dispersed fat-containing phase, such filament being characterized as displaying, at any transverse cross-section along its longitudinal axis, particles of fat-containing material having a diameter varying from 1 to 60 microns, the degree of saponification of the homogeneously, uniformly dispersed fat-containing material being no greater than 5% and the protein content of the matrix being substantially undegraded. The spun, filamentary edible protein matrix is prepared according to the novel process of the invention which introduces the fat-containing material into the core of the protein fiber without degrading the protein and without denaturing the fat-containing material. These objects are achieved by preparing and maintaining the protein gel at a low temperature (i.e. from about 2° to 25° C.), mixing the gel with a fat-containing material in liquid state, extruding the mixture through a shaping orifice (e.g. spinneret) and into a coagulating bath, the contact time for the protein gel and fat-containing material not exceeding 2 minutes, up to the passage through the shaping orifice.

DETAILED DESCRIPTION OF THE INVENTION

In the detailed description of the present invention which follows, by "fat-containing material" there is intended any fat or edible fat-containing material employed as such or in suitable admixture, namely, oils, animal or vegetable fats, and the like, and any edible fat-containing material containing at least one lipid soluble adjuvant such as, for example, flavorings and scents, artificial aromas, preservatives such as antioxidants, colorants, emulsifiers, vitamins or nutritional additives, such as N-acetyl-L-methionine.

The percentage ratio of the saponified ester groups to total ester groups in the fat-containing material mixed with the proteins is herein deemed the percentage of saponified fat-containing material or the degree of saponification of the fat-containing material.

The percentages expressed relative to the proteins refer to the dry product obtained by heating to constant weight in an oven at 110° C.

The spun proteins according to the present invention advantageously have a mean molecular weight of 50,000 to 100,000. They comprise filaments, the diameters of which advantageously vary from 10 to 300 microns, and the same containing particles of fat-containing material uniformly dispersed throughout the entire cross-section of the filaments, as described above. The structure of the said filaments is determined by photographing a transverse section of same through a microscope, after the fat-containing material had been extracted with hexane. The particles or globules of fat-containing material are found to have a diameter of 1 to 60 microns and typicaly of between 5 and 25 microns. In addition, the fat-containing material contained in the said filaments is not modified and its degree of saponification does not exceed 5%, as can be determined, in a known manner, by determining its ester group content.

The invention further relates to the process for the preparation of the aforesaid spun proteins, which consists in mixing the fat-containing material with a protein gel and wet spinning the mixture in a suitable coagulating medium, the said process being characterized in that the mixing is carried out under conditions which are such that the protein remains undegraded, in that the degree of saponification of the fat-containing material is at most 5%, and in that the fatty material is distributed in the protein gel in the form of particles having a diameter of 1 to 60 microns.

One way of preventing the saponification of the fat-containing material or of reducing it to a level of less than 5% is to limit the duration of the contact time between the protein gel and the fat-containing material, until the mixture is extruded through the die or spinneret orifices, to a maximum of 2 minutes. Contact times varying from 1 to 20 seconds are especially well-suited because the fat-containing material incorporated is thus free of saponified groups. Also, the protein gel is prepared and maintained at a low temperature so as to prevent protein degradation. The low temperature of the gel also minimizes the effect of alkaline medium on the fat when the materials are combined. Temperatures from about 2° to 25° C. are contemplated for the preparation and maintenance of the protein gel; however, temperatures of about 2° to 7° C. are preferred.

Numerous advantages are gained by the process of the invention. Protein filaments are obtained which contain fine particles of fat-containing material which have a diameter of but a few microns and are homogeneously and uniformly distributed throughout the entire cross-section of the filaments. The introduction of the fat-containing material inside the protein fiber makes it possible to retain the material during subsequent uses. Also, the nutritional integrity of the protein is retained. Further, it is important to point out that, by preventing any saponification, the process of the invention enables the fat-containing material incorporated to keep its taste and its integrity. Also, any desired amount of fat-containing material charged into the feed inlet ultimately becomes incorporated into the spun product. Therefore, not only the quality, but also the quantity of the fat-containing material is retained.

A further advantage of the process of the invention is attributable to the fact that the adjuvants can be introduced beforehand into the fat-containing material, which then makes it possible to incorporate them into the protein fibers without any denaturation. Previously, the various adjuvants were introduced only into the spinning solution, and therefore immediately were mixed with the protein gel, which frequently gave rise to their degradation on contact with the gel, which was most frequently alkaline, and a large portion of the adjuvants was lost during coagulation, neutralization and washing.

Another prior art method frequently used consisted in depositing the adjuvants onto the protein filaments by coating, but same effected only a surface distribution of the adjuvants (flavors and colorants), which was not at all satisfactory as regards the overall properties of the products obtained which simulated meat. The simultaneous introduction of the fat-containing material and adjuvants, according to the process of the invention, makes it possible to overcome the above-mentioned disadvantages.

The invention therefore relates to a new process for the production of spun proteins containing fat-containing material, characterized in that an aqueous suspension of vegetable and/or animal proteins is prepared and an aqueous alkaline solution is added to the said suspension in order to produce a protein gel; in that the protein gel is prepared and maintained at a temperature of from 2° to 25° C.; in that the fat-containing material, maintained in liquid state, and the said protein gel are separately fed, and at suitable relative flow rates, into the feed inlet for the die, at a point upstream or within a mixing device; in that the two separate flows are intimately mixed by any mechanical means for a period of time not exceeding two minutes, from initial contact, until spun; in that the mixture thus prepared is extruded through the spinneret orifices and is spun; and in that the filaments are ultimately coagulated in a coagulating bath.

The continuous filaments thus formed can be drawn, neutralized and washed.

The proteins employed according to the invention can be, in particular, isolates of vegetable proteins such as soya, sunflower, bean, horse bean, pea, peanut, corn, rapeseed, alfalfa, oats, barley and wheat, or animal proteins such as lactoproteins (casein, caseinate and seroproteins), gelatin, blood proteins and fish meals. Preferred raw materials are isolates of soya, sunflower, horse bean, milk casein, pea and bean.

The concentration of proteins in the aqueous suspension can vary over wide limits, namely from 5 to 40% by weight, but is preferably between 10 and 25% by weight.

The alkaline solution used for preparing the protein gel can advantageously be an aqueous solution of sodium hydroxide and/or of potassium hydroxide having a concentration such that the weight ratio of base/protein is 2 to 5%.

The fat-containing material incorporated into the proteins according to the invention can be any edible fat-containing material, employed as such or in admixture; typically, the various oils are used, such as peanut oil, olive oil, corn oil, sunflower oil, soya oil, nut oil, coconut oil, sesame seed oil, cottonseed oil, safflower oil, palm oil, or fish oils, and/or animal or vegetable fats such as butter, margarine, beef suet, lard and chicken fat.

The proportion of fat-containing material added to the protein gel can vary, depending on the type of product, e.g., meat, sought to be simulated, and typically ranges from 0.5 to 60%, and preferably from 5 to 30%, by weight relative to the proteins.

The fat-containing material can contain any adjuvant, provided the latter is lipid soluble. As exemplary of such adjuvants, there are mentioned: natural flavorings or scents which are generally protein hydrolysates; lipid soluble, edible, artificial aromas; lipid soluble antioxidants such as ascorbyl palmitate, thiodipropionic acid, dilauryl thiopropionate and distearyl thiopropionate; lipid soluble vitamins such as vitamin A, provitamin A or $\beta$-carotene, vitamin D and the vitamins B1 and B12; agents for enhancing aroma or taste; emulsifiers and lipid soluble colorants.

Flavors and scents, i.e., agents which serve the purpose of imparting the desired organoleptic and olfactory qualities to the proteins, are most frequently employed among the adjuvants which can be incorporated into the fat-containing material.

The natural flavors or scents particularly of value are protein hydrolysates such as ham aroma, beef aroma, pork aroma, onion aroma, fish aroma and other products extracted from the various types of meats or vegetables, provided that they can be homogeneously mixed with the fat-containing materials.

The proportions of lipid soluble adjuvants which are typically employed in the fat-containing material are such that they must satisfy two conditions. Firstly, the mixture of fat-containing material and lipid soluble adjuvant must be homogeneous. Secondly, the weight ratio of lipid soluble adjuvant/proteins must be between 0% and 15%. The weight ratio of lipid soluble adjuvant/proteins is preferably about 3 to 6%. However, these proportions can obviously vary depending on the type of adjuvant introduced.

An organic liquid can be used as the coagulating agent, but the use of an aqueous solution of an acid such as hydrochloric acid, acetic acid, citric acid, sulphur dioxide, sulphuric acid, nitric acid, phosphoric acid or other similar acids, or an aqueous solution of a salt such as sodium chloride, calcium chloride or sodium acetate, or an aqueous solution of an acid and of a salt such as those mentioned above, is preferred.

The concentration of acid in the bath can vary from 0.5% to 10% by weight, but is preferably between 2 and 5% by weight. The concentration of the salts can also vary considerably, namely, from 0.5% to 20% by weight, but it is preferably between 5% and 10% by weight. A preferred coagulating bath is an aqueous solution containing 5% by weight of acetic acid and 5% by weight of sodium acetate.

The process of the invention is carried out in the following manner.

The protein gel can be obtained by charging the alkaline solution into the protein dispersion, the amounts being predetermined.

A preferred variant of the process according to the invention consists in preparing, in a tank or vat, an aqueous suspension of isolates of vegetable and/or animal proteins, by stirring for a period of time which varies with the nature of the protein employed, from a few minutes to 2 or 3 hours. The suspension is then passed to a homogenizer, into which an alkaline solution is also introduced in such an amount and at such a concentration that the pH of the mixture which results is between 9 and 13.5, and preferably between 10 and 12, and that the weight ratio of base/protein range from 2 to 25%. This alkalization, which enables preparation of the spinnable protein gel, is carried out at 2° to 25° C. and preferably between 2° and 7° C.; the temperature in the homogenizer advantageously is maintained by a double-walled construction.

The duration of the operation varies, according to the equipment employed (which can advantageously be a double screw mixer, a malaxator or a static mixer), from 3 to 4 minutes up to about 30 minutes. In a discontinuous embodiment of the process, the total time of maintaining the protein gel does not generally exceed 60 minutes. However, it is advantageous to carry out the process continuously, which considerably reduces this time. The gel must, however, mature to a certain extent in order to reach the viscosity desired for spinning. The relatively low temperature at which the protein gel is maintained makes it possible to prevent degradation of the proteins and, consequently, to prevent unpleasant tastes, loss of nutritive value and formation of possibly toxic by-products which would otherwise result. The protein gel can advantageously be filtered, in a known manner, in order to remove the insoluble materials, the presence of which would cause problems during spinning.

A fat-containing material (or a mixture of fat-containing materials) which is liquid, or maintained liquid through heating, is then introduced into the feed inlet for the die, at a point just upstream of same. The amount of fat-containing material incorporated can be controlled, for example, by a regulating pump, the speed of rotation of which enables adjusting of the proportion of fat. The protein gel and the fat-containing material can be mixed, for example by a set of gear pumps and filters. The mixing can be improved by the use of a static mixer. The contact time of the fat-containing material with the protein gel is thus strictly limited to the period of time necessary only to obtain a good dispersion of the fat-containing material. This period of time does not exceed 2 minutes, but most frequently ranges between 1 and 20 seconds.

According to the present invention, the mixture of protein gel and fat-containing material is then extruded through one or more dies or spinnerets. The dies employed are usually of the type employed for spinning artificial or synthetic polymeric textiles. They are characterized by the number of orifices (typically from 2,000 to 15,000 orifices) which they have and by the diameter of these orifices (0.05 mm to 0.30mm).

The filaments obtained are gathered in a coagulating medium in which the die is immersed. The temperature at which the coagulation is carried out can vary within wide limits, namely, from 5° to 80° C., but it is most preferably selected as to be in the region of ambient temperature, i.e, 20° to 25° C. The filaments are then drawn or stretched which is determined by the difference between the exit speed, namely, the speed at which the threads exit the coagulating medium, and the speed of ultimate take-up, it being possible for the latter to be from 10 to 400% greater than the exit speed. The drawing effects a more or less extensive orientation of the protein chains and thus makes it possible to influence the thoughness or tenderness of the resultant fiber. In this manner, it is possible to simulate any desired type of flesh.

The filamentary tow or bundle thus obtained is then neutralized to pH values of between 4.5 and 6.5, and preferably about 5.5, this being the value which corresponds to the pH range displayed by the natural products. The choice of the composition and concentration of the neutralizing bath is determined by the acidity of the coagulating bath. The neutralizing bath used can be an aqueous solution of a base such as, for example, sodium hydroxide or potassium hydroxide, an aqueous solution of a salt such as sodium chloride, calcium chloride, sodium bicarbonate or potassium bicarbonate, or sodium carbonate or potassium carbonate, or an aqueous solution of a base and of a salt such as those mentioned above. The concentration of the neutralizing bath can vary over wide limits, namely, from 1 to 10% by weight for basic compounds and from 1 to 20% by weight for neutral compounds.

The tow is then washed with water in order to remove residual inorganic salts and to complete the neutralization, if necessary. This washing can be carried out by passing the tow through a bath, by running water over the tow on rollers, or by any other suitable system. Depending on the acidity of the coagulating medium, a single washing may be sufficient, without any neutralization phase being necessary.

The moist fibers resulting contain about 60 to 70% of water.

The invention will now be more fully explained with reference to FIG. 1 which illustrates one embodiment of suitable apparatus for carrying out the process according to the invention.

Figure 1:
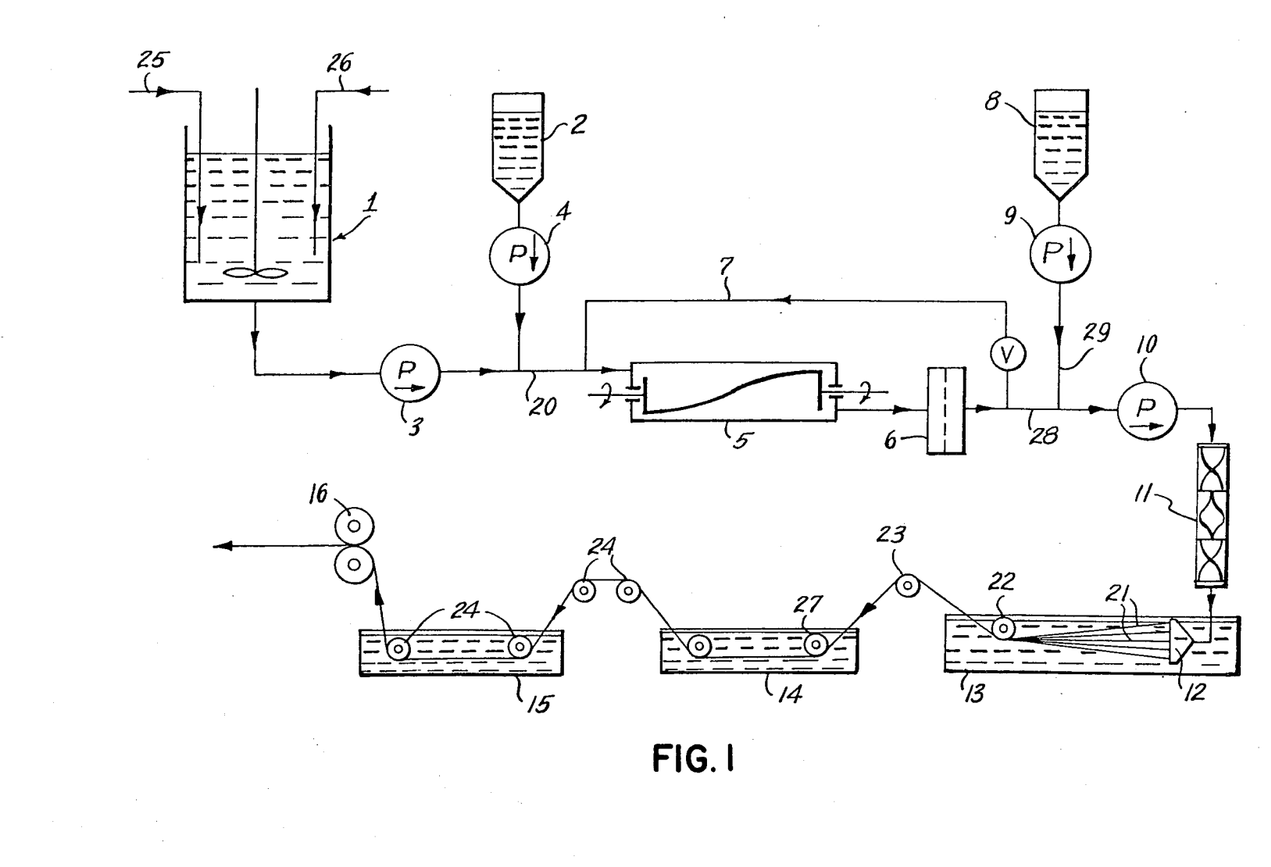
FIG. 1 is a schematic diagram of apparatus suited for carrying out the process according to the invention.
Figure 2:
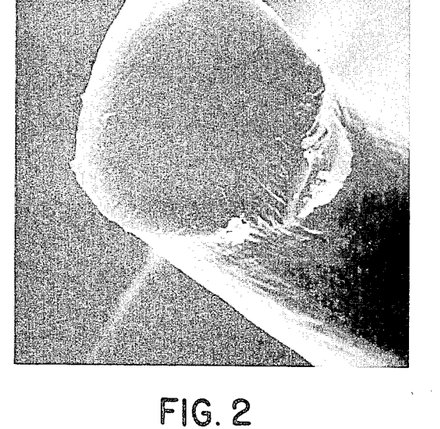
FIG. 2 is a photomicrograph of a soybean protein filament without added fat-containg material, in cross section (enlarged 1150 times).
Figure 3:
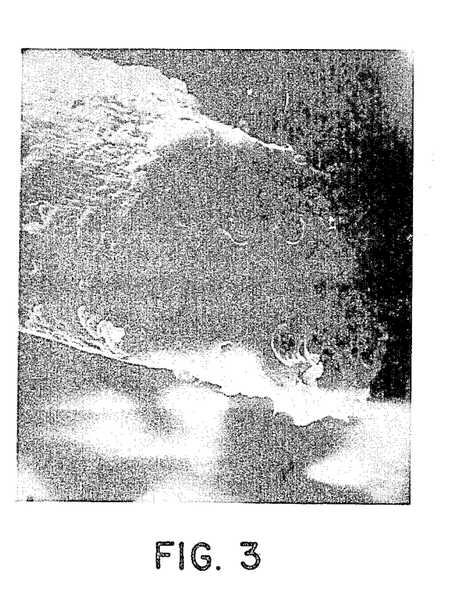
FIG. 3 is a photomicrograph of a soybean filament of the invention containing lard, in cross section (enlarged 1150 times). The holes correspond to the globules of fat-containing material, which have been extracted with hexane.
Figure 4:
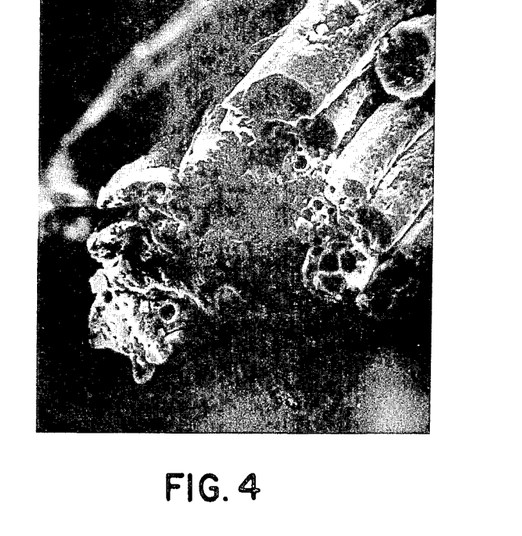
FIG. 4 is a photomicrograph of a bundle of soybean protein filaments of the invention containing lard (enlarged 240 times).

The apparatus depicted in the schematic diagram in FIG. 1 comprises a vat 1, into which the protein isolates 25 and water 26 are fed. The vat 1 is preferably provided with a means for stirring, which may be of any type usually employed, such as, for example, a propeller stirrer or also an anchor stirrer. This means of stirring ensures a good dispersion of the proteins in water, in order to obtain a homogeneous aqueous solution. The aqueous proteinaceous suspension is preferably conducted by means of the pump 3 through the conduit 20 into the homogenizer 5. The alkaline solution contained in the storage tank 2 is injected, by means of pump 4, into the conduit 20, downstream from the pump 3 and upstream from the homogenizer 5. The pump 4 is preferably a regulating pump. In another embodiment, and in order to ensure better mixing of the aqueous suspension of protein and the alkaline solution, the alkaline solution can be fed upstream of the pump 3, namely, at the inlet of such pump.

A homogenizer of any known type can, of course, be used as the homogenizer 5; for example, a static mixer can be used; screw homogenizers are especially well suited for this purpose. The protein gel leaving the homogenizer 5 can be directed into a filtering device.

The protein gel is then filtered, e.g., by passing it through a gauze in order to obtain a filtered protein gel. The protein gel can optionally be subjected to several successive filtrations by passing it through filtering gauzes of decreasing mesh sizes.

The fat-containing material contained in the tank 8 is introduced through the inlet tube 29, for example, by means of the pump 9 which can be a regulating pump, and is combined into the filtered protein gel collected at the outlet of the filter 6 by means of conduit 28. Optionally, for certain fat-containing materials having a melting point which is greater than ambient temperature, the tank 8 is advantageously provided with heating means which can be incorporated into the wall of the tank or can also consist of a heating element immersed in the tank.

The mixture of filtered protein gel and fat-containing material is introduced by means of the feed pump 10 into and through the spinneret head 12, the spinneret 10 being immersed in the coagulating bath 13. The feed pump 10 is preferably a regulating pump such as, for example, a gear pump. The feed pump 10 can also supply a plurality of spinnerets arranged in parallel. Depending on the respective outputs of the feed pump 10 on the one hand, and of the pumps 9, 4 and 3 on the other hand, it can be desirable to set up a partial recycling of the filtered protein gel, upstream of the homogenizer 5, by means of the line 7.

The die or spinneret 12 is optionally in operative engagement with a mixer 11, immediately upstream thereof; a static mixer, for example, is very particularly suitable. In FIG. 1, the mixer 11 is depicted as being at the outlet of the feed pump 10; it can also be situated upstream of the inlet of the pump 10.

At the outlet of the die 12, the filaments 21 are formed into a bundle or tow and are taken up on a roller 22. The bundle next passes onto a roller 23 and then onto a roller 27 and is thus fed into a neutralizing bath 12. Between the die and the roller 27, the filaments are subjected to a certain stretch or drawing which principally takes place in the air. This drawing is such that the length of the filaments increases by 10% to 400%. The bundle of filaments is then conveyed, by means of guide rollers such as 24, into and through one or more washing baths 15.

On leaving the coagulating bath, the bundle of filaments can optionally directly be conducted into the washing bath or baths, if neutralization is not necessary.

The process of washing the filaments by dipping them in the bath or baths 15 can be replaced by a process of washing the filaments by running water over them, it being possible for the filaments to be supported for such purpose by means of an endless belt.

The bundle of washed filaments can then be drained, for example, by passing same between two rollers 16.

The sequence of the operations described above can advantageously be carried out as part of a continuous process.

In order to further illustrate the present invention and the advantages thereof, the following specific examples are given, it being understood that the same are intended only as illustrative and in nowise limitative. Unless otherwise indicated, all percentages or parts indicated are by weight.

COMPARATIVE EXAMPLE

The following details an attempt to carry out the process of Boyer U.S. Pat. No. 2,730,447 at a low temperature so as to not to degrade the protein.

Into a mixer thermostated at 2° C., 5.1 liters of potable water were poured. Then, 1 kg of soybean isolate (pH 4.7, approximately 92% proteins) and 100 grams of gluten were added. Mixing was continued for 1 hour and 45 minutes, then the resultant paste was made alkaline with 47 grams of sodium hydroxide pellets, dissolved in 180 cc of water. Mixing was continued for 20 minutes. Then, 220 grams of melted lard were added and mixing was continued for an additional 5 minute period. The mixture was allowed to stand for 15 minutes and then was charged into a feeding box maintained at 15° C. and spun under the following conditions.

The gel was pumped through a filter of 200 mesh stainless steel screen, then was taken up by a metering pump with a flow rate of 131 cc/minute, corresponding to 7.8 liters/hour. This pump fed a spinneret with 747 holes of 0.15 mm diameter.

The coagulating bath had the composition as in Example 1 below.

The exit velocity of the fibrous material from the coagulating bath was 6.6 meters/minute.

There was progressive clogging of the spinneret, which required replacement hourly. The spinneret was immersed in the coagulating bath maintained at ambient temperature (23° C.), where the fat-containing material solidified and obstructed the spinneret.

EXAMPLE 1

13.5 kg of soya isolate and 80 liters of drinking water at 20° C. were charged into a 120 liter vat.

The soya isolate had the following characteristics:
Water content: 7%
Protein content: 95% of the dry material, namely 88.3% of the powder.
pH: 4.5±0.2
Density: 0.55

The stirring speed was 80 revolutions/minute and the suspension process required 15 minutes. The suspension was charged into a mixer with Z-shaped blades which was maintained, by thermostat, at a temperature of 5° C.

After the suspension had been charged, it was rendered alkaline with 3.2 liters at 36° Baumé strength sodium hydroxide solution (sodium hydroxide solution containing 400 g/liter). The mixture was malaxated for 20 minutes and charged into the hopper, which also was cooled to 5° C.

Beef suet, maintained in the liquid state (at 60° C.), was incorporated, at a point before the feed pump, by means of a gear pump, delivering 2.4 cm$^3$/revolution, which was adjusted so as to produce an output of suet of 1.7 kg/hour. The contact time between the protein gel and the suet was for about 20 seconds.

The gel was pumped onto a filter which was filled with 250 mesh stainless steel gauze (mesh size: 62 microns), and was then taken up by a feed pump having an output of 20 cm$^3$/revolution and a speed of 54 revolutins/minute (namely, an output of 64.8 liters/hour), which in turn supplied a die having 3,954 orifices of 0.15 mm diameter.

The duration of the wet-spinning was about 80 minutes.

The coagulation was carried out in a bath, the initial composition of which was as follows:
80 liters of water;
4 kg of acetic acid;
4 kg of sodium acetate.

The coagulating bath was replenished with a 10% strength aqueous solution of acetic acid, at a rate of 26 liters/hour. The solution of acetic acid and of sodium acetate which comprised the bath was removed at the same flow rate, in order to prevent the coagulating medium from becoming gradually richer in sodium acetate.

The threads of filaments were then washed by running tap water over same at a flow rate of about 400 liters/hour.

These fibers were then subjected to discontinuous washing in a 2.5% strength sodium bicarbonate solution, and then to washing with water.

The filaments obtained exhibited the following characteristics:
Composition per 100 g of moist filaments:
  70 g of water;
  30 g of solids, of which 4.5 g were suet and 25.5 g were soya isolate;
pH: 5.8;
Diameter of the filaments: 115 to 130 microns;
Diameter of the suet particles: 5 to 15 microns.

EXAMPLE 2

23 Liters of drinking water and 4.5 kg of sunflower isolate having a protein purity of at least 90% were charged into a malaxator maintained, by thermostat, at a temperature of 5° C. After stirring for 30 minutes, the mixture was rendered alkaline with 525 cm$^3$ of 36° Baumé strength sodium hydroxide solution (sodium hydroxide solution containing 400 g/liter), i.e., a ratio of 46.6 g of pure sodium hydroxide per kg of isolate.

After homogenization for 20 minutes at 5° C., a protein gel having a pH of 12 was obtained; same was allowed to stand for 10 minutes before spinning. The concentration of dry product in this gel was 15% by weight. The gel was charged into the spinning hopper which was cooled to 5° C. Lard maintained in liquid state (at about 40° C.) was incorporated, at a point upstream of the feed pump, by a gear pump which was adjusted so as to give an output of 24.3 cm$^3$ of lard/minute. The mixture of gel and lard was extruded through the die by the feed pump at a flow rate of 1,080 cm$^3$/minute. The die employed had 3,954 orifices of 0.15 mm diameter.

The duration of the spinning was 30 minutes. The contact time of the protein gel with the lard was about 10 seconds.

The coagulation of the filaments was carried out as in the preceding example in a bath containing 5% of acetic acid and 5% of sodium acetate. The threads were washed and taken up as in Example 1.

The filaments obtained had the following characteristics:
Composition per 100 g of moist filaments:
  70 g of water;
  30 g of solids, of which 4.5 g were lard and 25.5 g were sunflower isolate;
pH: 5.7;
Diameter of the filaments: 115 to 130 microns;
Diameter of the lard particles: 5 to 15 microns.

EXAMPLE 3

15.650 Liters of water and 4.8 kg of acid casein were charged into a malaxator maintained, by thermostat, at a temperature of 5° C. The mixture was stirred for 2 hours in order to obtain a homogeneous suspension. It was rendered alkaline by adding 525 cm$^3$ of 36° Baumé strength sodium hydroxide solution (sodium hydroxide solution containing 400 g/liter), i.e., a ratio of 43.8 g of pure sodium hydroxide per kg of casein. The mixture was stirred for an additional 20 minutes and allowed to stand for 10 minutes. 15% by weight of lard relative to the casein was incorporated by following the procedure of Examples 1 and 2; the injection flow rate of the fat-containing material was adjusted to 37 cm$^3$/minute. The mixture was spun through a die having 3,954 orifices of 0.15 mm diameter, at a feed rate through the die of 1,080 cm$^3$/minute. The spinning required 30 minutes. The filaments were coagulated in an aqueous bath containing 5% by weight of acetic acid and 5% by weight of calcium chloride; the pH of the coagulating bath was 2.2. The threads were drawn off from the coagulating bath at a speed of 10 meters per minute and were then washed. The contact time of the protein gel with the fat-containing material was about 10 seconds.

The filaments obtained exhibited the following characteristics:
Composition per 100 g of moist filaments:
  67 g of water;
  33 g of solids, of which 4.95 g were lard and 28.05 g were casein isolate;
pH: 5.0;
Diameter of the filaments: from 125 to 145 microns;
Diameter of the lard particles: 5 to 15 microns.

EXAMPLE 4

13.5 kg of soya isolate and 80 liters of drinking water at 20° C. were charged into a 120 liter vat.

The soya isolate exhibited the following characteristics:
Water content: 7%;
Protein content: 95% of the dry material, namely, 88.3% of the powder;
pH: 4.5±0.2;
Density: 0.55.

The stirring speed was 80 revolutions/minute and the suspension process required 15 minutes. The suspension was charged into a mixer with Z-shaped blades which was maintained, by thermostat, at a temperature of 5° C.

After the suspension had been charged, it was rendered alkaline with 3.2 liters of 36° Baumé strength sodium hydroxide solution (sodium hydroxide solution containing 400 g/liter). The mixture was malaxated for 20 minutes and charged into the feed hopper which was also cooled to 5° C.

A fat-containing material, namely liquid palm oil (maintained at 60° C.) in which a lipid soluble onion aroma was dispersed at a concentration of 0.66% by weight, was incorporated. The incorporation was carried out, at a point just upstream of the feed pump, by a gear pump delivering 1.2 cm$^3$/revolution which was adjusted to 28 revolutions/minute in order to give an output of 2 kg/hour. The contact between the protein gel and the fat-containing material containing the onion aroma was about 10 seconds.

The gel was pumped onto a filter which was filled with 250 mesh stainless steel gauze (mesh size 62μ), and was then taken up by a feed pump, having an output of 20 cm$^3$/revolution and a speed of 54 revolutions/minute (i.e., an output of 64.8 liters/hour, namely, about 9.3 kg of soya per hour), which was fed to a die having 3,954 orifices of 0.15 mm diameter.

The duration of spinning was about 80 minutes.

The coagulation was carried out in a bath having the following composition:
80 liters of water;
4 kg of $CH_3COOH$;
4 kg of $CH_3COONa$.

The coagulating bath was replenished with a 10% strength aqueous solution of $CH_3COOH$, at a rate of 26 liters/hour. The solution of $CH_3COOH$ and $CH_3COONa$ was removed at the same flow rate, in order to prevent the medium from becoming gradually richer in CH₃COONa.

The threads were then washed by running drinking water over same at about 150 liters/hour.

The filaments obtained exhibited the following characteristics:

Composition per 100 g of moist filaments:
- 70 g of water;
- 30 g of solids, of which 5.28 were flavored palm oil and 24.72 g were soya isolate. The amount of aroma was about 35 mg, which represents 0.35 g of aroma per kg of moist fiber.

pH: 5.8;

Diameter of the filaments: 115 to 130μ.

Diameter of the particles of fat-containing material: 5 to 15μ.

EXAMPLE 5

The procedure of Example 4 was followed, with the same equipment and the same amount of soya isolate.

A lipid soluble fish aroma was dissolved in the liquid palm oil (maintained at 60° C.) at a rate of 33% by weight relative to the palm oil. The flavored palm oil was incorporated, at a point just upstream of the feed pump, by a gear pump having an output of 1.7 kg/hour. The contact time of the protein gel with the flavored palm oil was about 10 seconds.

The spinning, coagulation and washing were carried out as in the preceding example.

The filaments obtained had the following composition:

Per 100 g of moist fibers:
- 70 g of water;
- 30 g of solids, of which 25.5 g were soya and 4.5 g were palm oil containing 33% of fish aroma, which represents 1.5 g of aroma per 100 g of moist fiber.

EXAMPLE 6

The procedure of Example 5 was followed, with the following differences:

Fat-containing material used: lard

Lipid soluble aroma: ham aroma at 44.5% strength in the mixture of lard+aroma.

The filaments obtained had the following composition per 100 g of moist fibers:
- 70 g of water;
- 30 g of solids, of which 25.5 g were soya and 4.5 g were flavored lard, which corresponds to 2 g of ham aroma per 100 g of moist fiber.

EXAMPLE 7

40 Liters of water were charged into a 70 liter mixer thermostated at 5° C. and allowed to reach thermal equilibrium over a 2 hour period. Then 6.750 kg of soybean isolates were added and dispersed, with agitation, over a 60 minute period. At the end of that time, 1200 cc of 36° Baumé aqueous sodium hydroxide solution (sodium hydroxide content of 400 grams/liter) were added and mixing were continued for 20 minutes.

The protein gel was allowed to stand for 10 minutes, then was charged into a feeding box thermostated at 5° C. and fed to a spinneret with 3,954 holes of 0.15 mm diameter at a flow rate of 1080 cc/minute, as in Example 1.

As in Example 1, the fat-containing material, which in this instance was palm oil, was kept liquid in a reservoir thermostated at 60° C. and was injected by means of a gear pump at the level of the metering pump, the flow rate of the palm oil being set at 28.8 cc/minute.

The contact time between the palm oil and the alkaline protein solution was less than 10 seconds.

The spinning conditions were those of Example 1.

The filaments obtained had the following characteristics:
- 70% water;
- 30% dry matter, containing 4.8 grams of palm oil and 25.2 grams of soybean isolate.

EXAMPLE 8

A protein isolate of peas, isolated at pH 9, having a water content of 3% and a protein content expressed as 92.5% of the dry material, was employed.

32 Liters of water was placed in a double-jacketed mixer thermostated at 5° C. and allowed to reach thermal equilibrium over a two-hour period, with agitation. Then, 6 kg of the pea isolate were added and agitation was continued for 2 hours to obtain a homogeneous suspension, the temperature being maintained at 5° C. throughout. At the end of that time, 800 cc of aqueous sodium hydroxide (36° Baumé) was added and mixing was continued for 20 minutes. The resultant protein gel was allowed to stand for 10 minutes to facilitate degassing and then was processed generally as in Example 7, using the apparatus as in Example 1, the gel being maintained at 5° C. until it reached the spinneret and the palm oil being maintained in liquid form in a reservoir heated to 60° C. However, the peas protein solution was pumped at a flow rate of 800 cc/minute and the palm oil at a rate of 15.6 cc/minute by a gear pump with a capacity of 1.2 cc/revolution, set at 13 rpm. The outlet valocity for the filaments from the coagulating bath was 12 meters/minute; the fibers were recovered at 13 meters/minute.

The fibers which were obtained had the following content:
- 70% water;
- 3.3% palm oil;
- 26.7% pea isolate.

EXAMPLE 9

A bean protein isolate having the following characteristics was used:
- water content: 3.5%;
- pH: 7;
- Protein conetent: 95% with respect to the dry matter.

Into a mixer thermostated at 5° C., 33 liters of water were charged and then allowed to reach thermal equilibrium over a two-hour period. Then, 6 kg of the bean protein isolate were added and the suspension was agitated for 2 hours, then made alkaline with 800 cc of 36° Baumé aqueous sodium hydroxide solution and mixed for 20 minutes. That suspension was allowed to rest for 10 minutes, then was transferred to a feeder box refrigerated at 5° C.

The incorporation of palm oil, maintained liquid at 60° C., was effected by means of a 1.2 cc/revolution gear pump set at 13 rpm, yielding a flow rate of 936 cc/hour. The contact time between the protein solution and the palm oil was less than 10 seconds.

The protein gel was pumped through a filter equipped with a stainless steel screen of 250 mesh (mesh opening 62μ), then was taken up by a metering pump with a flow rate of 22 cc/revolution, set at 40 rpm, yielding a flow rate of 48 liters/hour. This pump supplied a spinneret with 3,954 holes of 0.15 mm diameter.

The duration of spinning was 40 to 45 minutes.

Coagulation was effected at the ambient temperature of 23° C. in a solution having an initial composition of 80 liters of water, 4 kg of acetic acid and 4 kg of sodium acetate. The coagulating bath was renewed with a 10% acetic acid solution at a rate of 20 liters/hour. The coagulating solution was discharged at the same rate to prevent enrichment in sodium acetate over the course of time.

The fibers, which exited at a velocity of 12 to 13 meters/minute, were washed with running water of potable quality of approximated 400 liters/hour, then were washed discontinuously with a 2.5% sodium bicarbonate solution and then again with water.

The content of 100 grams of moist fibers was:
70 grams of water;
3.5 grams of palm oil;
26.5 grams of bean protein.

The process according to the invention can advantageously be used for the preparation of protein products, the texture, taste, appearance and nutritive qualities of which closely approximate those of meat, and the cost of which is much lower than that of real meat.

In fact, the fibers obtained can be bonded together using egg albumin, fish albumin, gelatin, soya proteins, starch, casein, pectins, or gums such as carboxymethylcellulose.

Other ingredients can be added without any constraints other than the desired properties of texture, flavor, scent and apearance, provided the ingredients are edible and permitted by the legislation relating to foodstuff products. If necessary, various permitted foodstuff colorants, artifical or natural aromas, salt, sugar, wheat gluten, monosodium glutamate, skimmed or dehydrated milk solids, spices, pepper, vitamins and other similar compounds, for example, may be added.

The invention therefore makes it possible to introduce inexpensive vegetable or animal proteins into human and animal foodstuffs, imparting to them most of the qualities of the various types of animal meats which are high-protein foods.

While the invention has been described in terms of various preferred embodiments, the skilled artisan will appreciate that various modifications, substitutions, omissions, an changes may be made without departing from the spirit thereof. Accordingly, it is intended that the scope of the present invention be limited solely by the scope of the following claims.

what is claimed is:

1. A process for preparing a shaped article comprising a spun, filamentary edible protein matrix, said filamentary matrix having uniformly and homogeneously dispersed therein, both in transverse cross-section and along its longitudinal axis, a plurality of fat-containing globules varying in diameter between about 1 to 60 microns, the degree of saponification of the fat-containing material comprising said globules being no greater than 5% and the protein in said matrix being substantially undegraded, which process comprises: admixing a gel of edible protein, prepared and maintained at a temperature of from about 2° to 25° C., with a fat-containing material maintained in liquid state, to form a spinning solution comprising said gel of edible protein and said fat-containing material; extruding said spinning solution through a shaping orifice; and passing the extruded material into a coagulating bath to coagulate the extruded material and thus form the shaped article, the period of time during which said gel of edible protein and said fat-containing material are in contact with each other not exceeding 2 minutes from initial contact up to extrusion through said shaping orifice.

2. The process of claim 1 wherein the period of time during which said gel of edible protein and said fat-containing material are in contact with each other from initial contact up to extrusion is from about 1 to 20 seconds.

3. The process of claim 1 or 2 wherein said gel of edible protein is prepared and maintained at a temperature of from about 2° to 7° C.

4. The process of claim 1 wherein said gel of edible protein comprises an equeous alkaline solution.

5. The process of claim 2 wherein said gel of edible protein comprises an aqueous alkaline solution.

6. The process of claim 3 wherein said gel of edible protein comprises an aqueous alkaline solution.

7. The process of claim 1 wherein the period of time during which said gel of edible protein and said fat-containing material are in contact with each other from initial contact up to extrusion does not exceed 10 seconds.

8. The process of claim 4 wherein the aqueous alkaline solution comprises between about 5 and 40% by weight of the edible protein.

9. The process of claim 8 wherein the aqueous alkaline solution comprises between about 10 and 25% by weight of the edible protein.

10. The process of claim 4 wherein the fat-containing material comprises between about 0.5 and 60% by weight of the admixture, based upon the weight of the edible protein.

11. The process of claim 10 wherein the fat-containing material comprises between about 5 and 30% by weight of the admixture, based upon the weight of the edible protein.

12. The process of claim 5 wherein the coagulating bath includes a member selected from the group consisting of an acid, a salt, and admixtures thereof.

13. The process of claim 12 wherein the coagulating bath comprises between about 0.5 and 10% by weight acid.

14. The process of claim 12 wherein the coagulating bath comprises between about 0.5 and 20% by weight salt.

15. The process of claim 13 wherein the coagulating bath comprises between about 0.5 and 20% by weight salt.

16. The process of claim 12 wherein the pH of the spinning solution is from about 9 to 13.5.

17. The process of claim 16 wherein the pH is from about 10 to 12.

18. The process of claim 16, further comprising washing the shaped article.

19. The process of claim 18 wherein the shaped article is neutralized prior to washing.

20. The process of claim 18, further comprising drawing the resultant shaped article.

21. The process of claim 20 wherein the drawing is from about 10 to about 400%.

22. The process of claim 10 wherein the fat-containing material comprises a lipid soluble adjuvant.

23. The process of claim 10 wherein the edible protein is selected from the group consisting of vegetable protein, animal protein, and admixtures thereof.

* * * * *